(12) United States Patent
Gavens et al.

(10) Patent No.: US 9,734,098 B2
(45) Date of Patent: Aug. 15, 2017

(54) MEMORY BUS MANAGEMENT

(71) Applicant: SANDISK TECHNOLOGIES LLC, Plano, TX (US)

(72) Inventors: Lee Gavens, Milpitas, CA (US); Daniel Lee, Milpitas, CA (US); Meiqing He, Milpitas, CA (US); Christopher Dinh, Milpitas, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 327 days.

(21) Appl. No.: 14/675,353

(22) Filed: Mar. 31, 2015

(65) Prior Publication Data

US 2016/0292092 A1 Oct. 6, 2016

(51) Int. Cl.
G06F 9/30 (2006.01)
G06F 13/16 (2006.01)
G06F 3/06 (2006.01)
G06F 13/40 (2006.01)

(52) U.S. Cl.
CPC ........ *G06F 13/1642* (2013.01); *G06F 3/0604* (2013.01); *G06F 3/0629* (2013.01); *G06F 3/0688* (2013.01); *G06F 13/161* (2013.01); *G06F 13/4068* (2013.01)

(58) Field of Classification Search
None
See application file for complete search history.

(56) References Cited

U.S. PATENT DOCUMENTS

2012/0159495 A1* 6/2012 Rajagopalan ......... G06F 9/5066
718/102

* cited by examiner

*Primary Examiner* — Cheng-Yuan Tseng
(74) *Attorney, Agent, or Firm* — Foley & Lardner LLP

(57) ABSTRACT

A method of managing a memory bus includes identifying sub-operations required for execution of commands, maintaining a list of released sub-operations containing only released unexecuted sub-operations directed to individual dies that are identified as available, accessing the dies until the list is empty, subsequently, polling to identify dies that are available, and subsequently resuming accessing the dies by executing only sub-operations from the list until the list is empty.

23 Claims, 12 Drawing Sheets

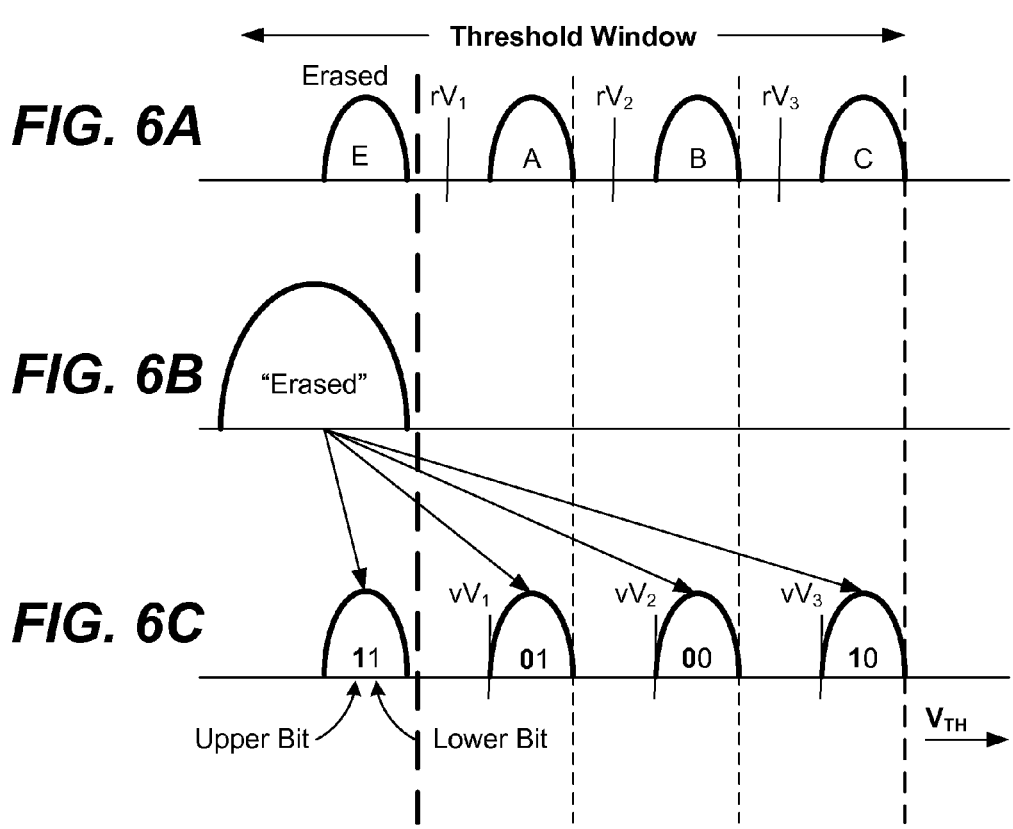
Programming into four states represented by a 2-bit code

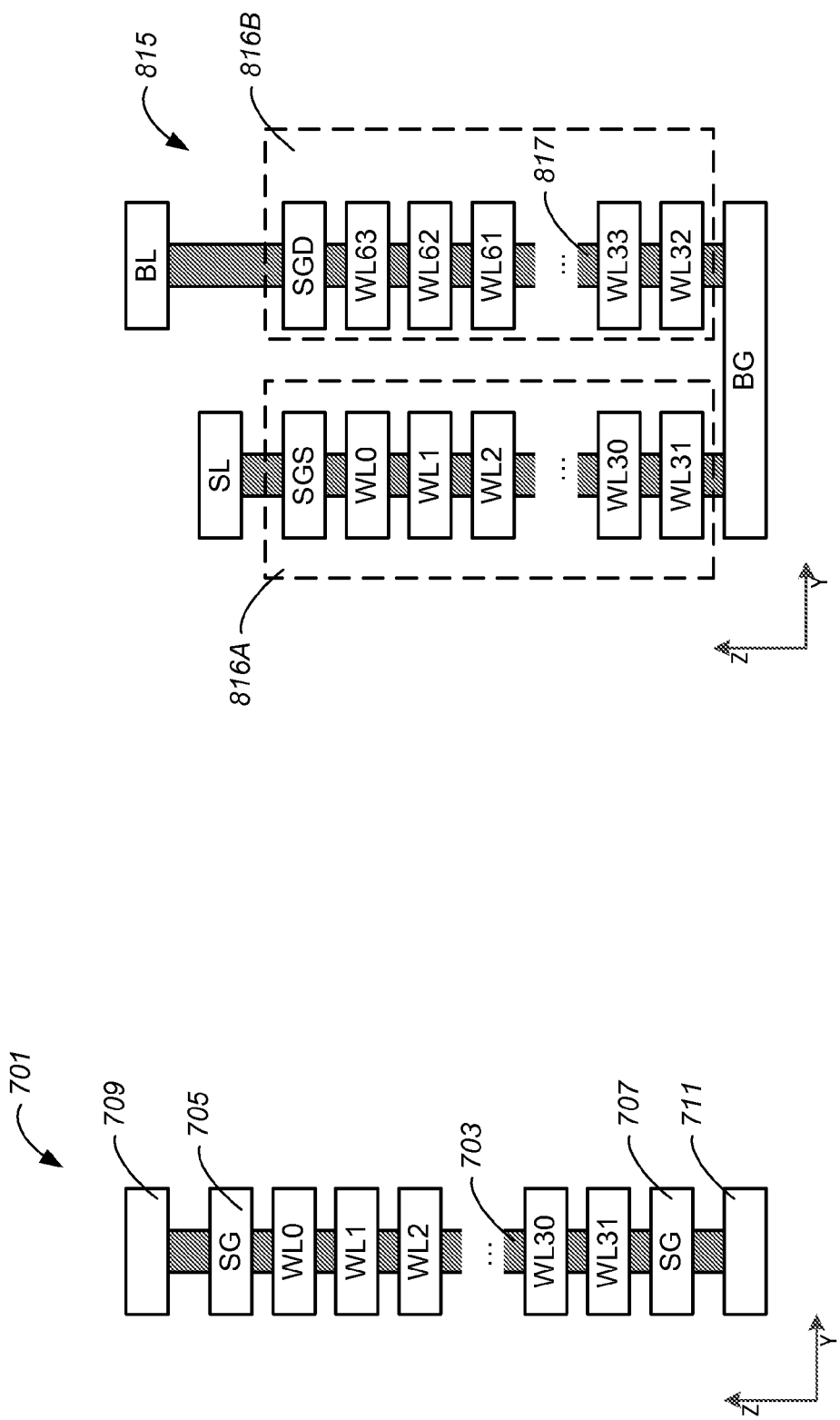

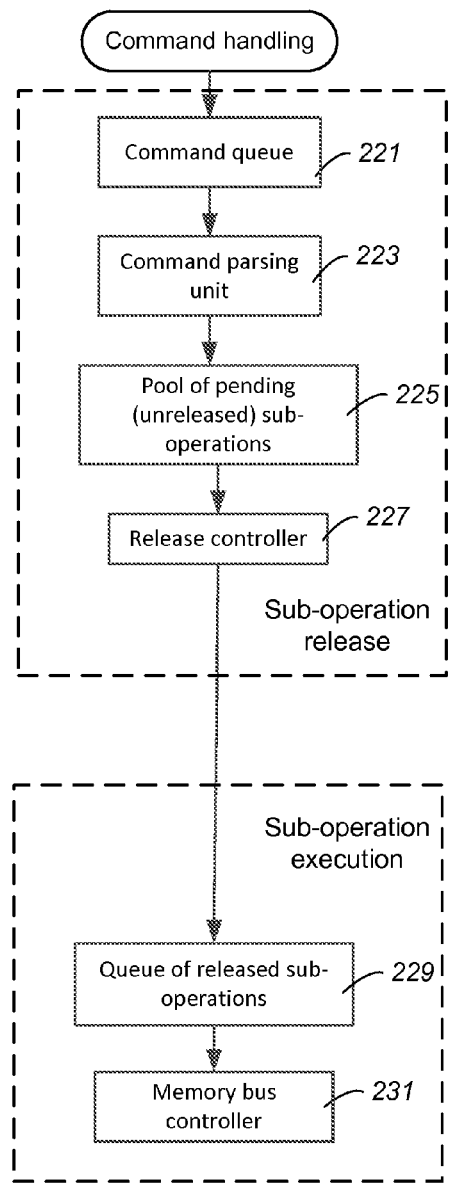
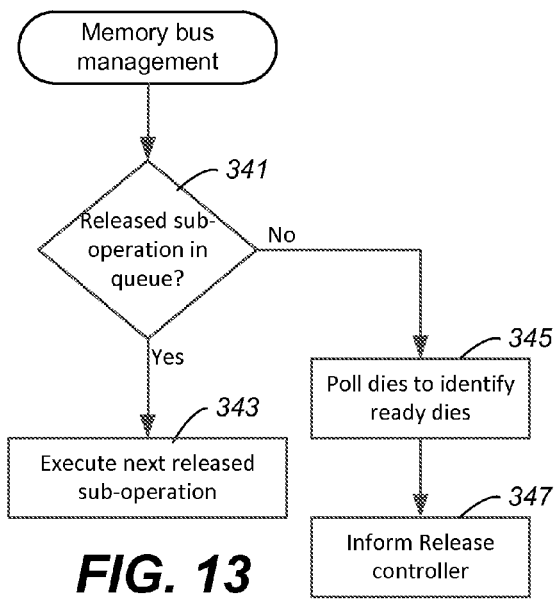
FIG. 12
FIG. 13

MEMORY BUS MANAGEMENT

BACKGROUND

This application relates to the operation of re-programmable nonvolatile memory such as semiconductor flash memory.

Solid-state memory capable of nonvolatile storage of charge, particularly in the form of EEPROM and flash EEPROM packaged as a small form factor card, has become the storage of choice in a variety of mobile and handheld devices, notably information appliances and consumer electronics products. Unlike RAM (random access memory) that is also solid-state memory, flash memory is non-volatile, and retains its stored data even after power is turned off. Also, unlike ROM (read only memory), flash memory is rewritable similar to a disk storage device.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) to be applied to the control gate before the transistor is turned "on" to permit conduction between its source and drain regions. Flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

Nonvolatile memory devices are also manufactured from memory cells with a dielectric layer for storing charge. Instead of the conductive floating gate elements described earlier, a dielectric layer is used. An ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is implemented by separately reading the binary states of the spatially separated charge storage regions within the dielectric.

Many nonvolatile memories are formed along a surface of a substrate (e.g. silicon substrate) as two dimensional (2D), or planar, memories. Other nonvolatile memories are three dimensional (3-D) memories that are monolithically formed in one or more physical levels of memory cells having active areas disposed above a substrate.

SUMMARY

In some nonvolatile memory systems, two or more memory dies may communicate with a memory controller over a shared bus. Such a bus may become a bottleneck if it is not efficiently managed. In particular, where a memory bus is occupied by polling a die to identify when the die is ready, this makes the memory bus unavailable for other purposes even when other dies may be ready and could be used. An example of a memory bus management scheme parses received commands into sub-commands that then each occupy the memory bus for a continuous period of time (i.e. they have uninterrupted use of the memory bus). The sub-operations are released for execution only when their corresponding dies are ready. Thus, when a sub-operation is released, it can be executed immediately without polling the corresponding die. Polling only occurs when there are no more released sub-operations to execute. Thus, as long as there are sub-operations with corresponding dies identified as ready, execution of the sub-operations continues without delays for polling. Only when there are no more sub-operations with corresponding dies identified as ready does polling occur so that opportunities for execution are not lost due to polling.

An example of a method of managing a memory bus includes: receiving a plurality of memory access commands directed to a plurality of nonvolatile memory dies connected to the memory bus; identifying sub-operations required for execution of the plurality of memory access commands, execution of an individual memory access command requiring execution of two or more sub-operations; maintaining a first list of sub-operations required for execution of the plurality of memory access commands, the first list containing unreleased unexecuted sub-operations directed to individual dies that are not identified as available and unexecuted sub-operations directed to individual dies that are identified as available and for which a gating condition applies; maintaining a second list of sub-operations required for execution of the plurality of memory access commands, the second list containing only released unexecuted sub-operations directed to individual dies that are identified as available; accessing the plurality of memory dies through the memory bus by executing only sub-operations from the second list until the second list is empty; subsequently, when the second list is empty, polling the plurality of nonvolatile memory dies to identify individual nonvolatile memory dies of the plurality of nonvolatile memory dies that are available; in response to identifying one or more available nonvolatile memory dies of the plurality of nonvolatile memory dies, moving one or more sub-operations from the first list to the second list; and subsequently resuming accessing the plurality of nonvolatile memory dies through the memory bus by executing only sub-operations from the second list until the second list is empty.

Polling the plurality of nonvolatile memory dies may occur in response to the second list becoming empty and no polling may occur when there is at least one sub-operation in the second list. Operation may alternate between polling the plurality of nonvolatile memory dies and accessing the plurality of nonvolatile memory dies through the memory bus until all sub-operations required for execution of the plurality of memory access commands are executed. Resuming accessing the plurality of nonvolatile memory dies may occur as soon as a new entry is added to the second list. Execution of an individual sub-operation may be an atomic execution that occupies the memory bus without interruption for a continuous period of time. The plurality of memory access commands may include a relocation command to copy data from a first physical location to a second physical location and the one or more sub-operations may include one or more reads from the first location and one or more writes to the second location, and moving the one or more writes from the first list to the second list may occur only after the one or more reads are complete. Unexecuted sub-operations may be moved from the first list to the second list according to an order for execution of sub-operations corresponding to an order specified by a host for execution of the plurality of memory access commands. Unexecuted write sub-operations relating to memory management data may be moved from the first list to the second list according to an order specified by a memory controller. When moving the one or more sub-operations from the first list to the second list in response to identifying one or more available nonvolatile memory dies of the plurality of nonvolatile memory dies, moving a sub-operation of the one or more sub-operations from the first list to the second list may be delayed to thereby maintain a power consumption level below a power consumption limit. When moving the one or more sub-operations from the first list to the second list in response to identifying one or more available nonvolatile memory dies of the plurality of nonvolatile memory dies, sub-operations may be prioritized according to a prioritization scheme. The prioritization scheme may prioritize read sense sub-operations over read transfer sub-operations.

An example of a nonvolatile memory system includes: a plurality of nonvolatile memory dies; a memory bus connected to the plurality of nonvolatile memory dies; an interface configured to receive a plurality of memory access commands directed to the plurality of nonvolatile memory dies; a command parsing unit configured to identify sub-operations required for execution of the plurality of memory access commands, execution of an individual memory access command requiring execution of two or more sub-operations; a first list of sub-operations required for execution of the plurality of memory access commands, the first list containing unreleased unexecuted sub-operations; a second list of sub-operations required for execution of the plurality of memory access commands, the second list containing only released unexecuted sub-operations directed to individual nonvolatile memory dies that are identified as available, the plurality of nonvolatile memory dies accessed through the memory bus by executing only sub-operations from the second list until the second list is empty; a die polling unit configured to poll the plurality of nonvolatile memory dies to identify individual nonvolatile memory dies of the plurality of nonvolatile memory dies that are available; and a list updating unit configured to update the second list by releasing a sub-operation for an individual nonvolatile memory die in response to identification of the individual nonvolatile memory die of the plurality of nonvolatile memory dies as available.

The die polling unit may be configured to remain inactive whenever there is at least one unexecuted sub-operation in the second list. The command parsing unit may be configured to identify sub-operations that are atomic such that an individual sub-operation occupies the memory bus without interruption for a continuous period. The list updating unit may move individual unexecuted sub-operations directed to individual nonvolatile memory dies that are identified as available by the polling unit from the first list to the second list according to an order specified by a host or by a memory controller. The list updating unit may be configured to move individual unexecuted sub-operations directed to individual nonvolatile memory dies that are identified as available by the polling unit from the first list to the second list such that the number of busy memory dies does not exceed a maximum number that is fewer than all memory dies of the plurality of memory dies. An individual nonvolatile memory die of the plurality of nonvolatile memory dies may be a three dimensional nonvolatile memory die that is monolithically formed in one or more physical levels of arrays of memory cells having an active area disposed above a silicon substrate. The nonvolatile memory system may include: an additional memory bus connected to additional nonvolatile memory dies; and the first list may contain unexecuted sub-operations directed to individual nonvolatile memory dies of the plurality of nonvolatile memory dies and of the additional nonvolatile memory dies and the second list may contain only unexecuted sub-operations directed to individual nonvolatile memory dies of the plurality of nonvolatile memory dies.

An example of a method of managing a memory bus includes: receiving a plurality of memory access commands directed to a plurality of nonvolatile memory dies connected to the memory bus; identifying sub-operations required for execution of the plurality of memory access commands, execution of an individual memory access command requiring execution of two or more sub-operations, each sub-operation being an atomic operation that occupies the memory bus without interruption for a continuous period of time; maintaining a first list of unreleased sub-operations required for execution of the plurality of memory access commands, the first list containing unexecuted sub-operations directed to individual dies that are not identified as available and unexecuted sub-operations directed to dies that already have a released sub-operation; maintaining a second list of released sub-operations required for execution of the plurality of memory access commands, the second list containing only unexecuted sub-operations directed to individual dies that are identified as available, with a maximum of one unexecuted sub-operation per nonvolatile memory die that is identified as available; accessing the plurality of memory dies through the memory bus by executing only released sub-operations from the second list until the second list is empty; subsequently, in response to determining that the second list is empty, polling the plurality of nonvolatile memory dies to identify individual nonvolatile memory dies of the plurality of nonvolatile memory dies that are available; in response to identifying one or more available nonvolatile memory dies of the plurality of nonvolatile memory dies, releasing one or more sub-operations from the first list to the second list; subsequently resuming accessing the plurality of nonvolatile memory dies through the memory bus by executing only released sub-operations from the second list until the second list is empty, no polling of the plurality of nonvolatile memory dies occurring from the resuming until the second list is empty; and subsequently alternating between polling the plurality of nonvolatile memory dies and accessing the plurality of memory dies until all sub-operations required for execution of the plurality of memory access commands are executed.

The releasing of the one or more sub-operations from the first list to the second list may be performed according to at least one of: an order specified by a host, an order specified by a memory controller, or a power requirement. An individual nonvolatile memory die of the plurality of nonvolatile memory dies may be a three dimensional nonvolatile memory die that is monolithically formed in one or more physical levels of arrays of memory cells having an active area disposed above a silicon substrate. Identifying sub-operations may include: identifying a read sense sub-operation and a read transfer sub-operation for each received read command; identifying a write transfer sub-operation and a write status check sub-operation for each received write command; and identifying an erase initiation sub-operation and an erase status check sub-operation for each received erase command. The method may also include: receiving a plurality of non-access commands, execution of an individual non-access command requiring execution of one or more sub-operation.

Various aspects, advantages, features and embodiments are included in the following description of exemplary examples thereof, which description should be taken in conjunction with the accompanying drawings.

BRIEF DESCRIPTION OF THE DRAWINGS

FIGS. 6A-6C illustrate an example of programming a population of memory cells.

FIG. 7 shows an example of a physical structure of a 3-D NAND string.

FIG. 8 shows an example of a physical structure of a U-shaped 3-D NAND string.

FIG. 12 illustrates an example of how commands may be handled.

FIG. 13 shows an example of steps in memory bus management.

DETAILED DESCRIPTION

Memory System

Figure 1:
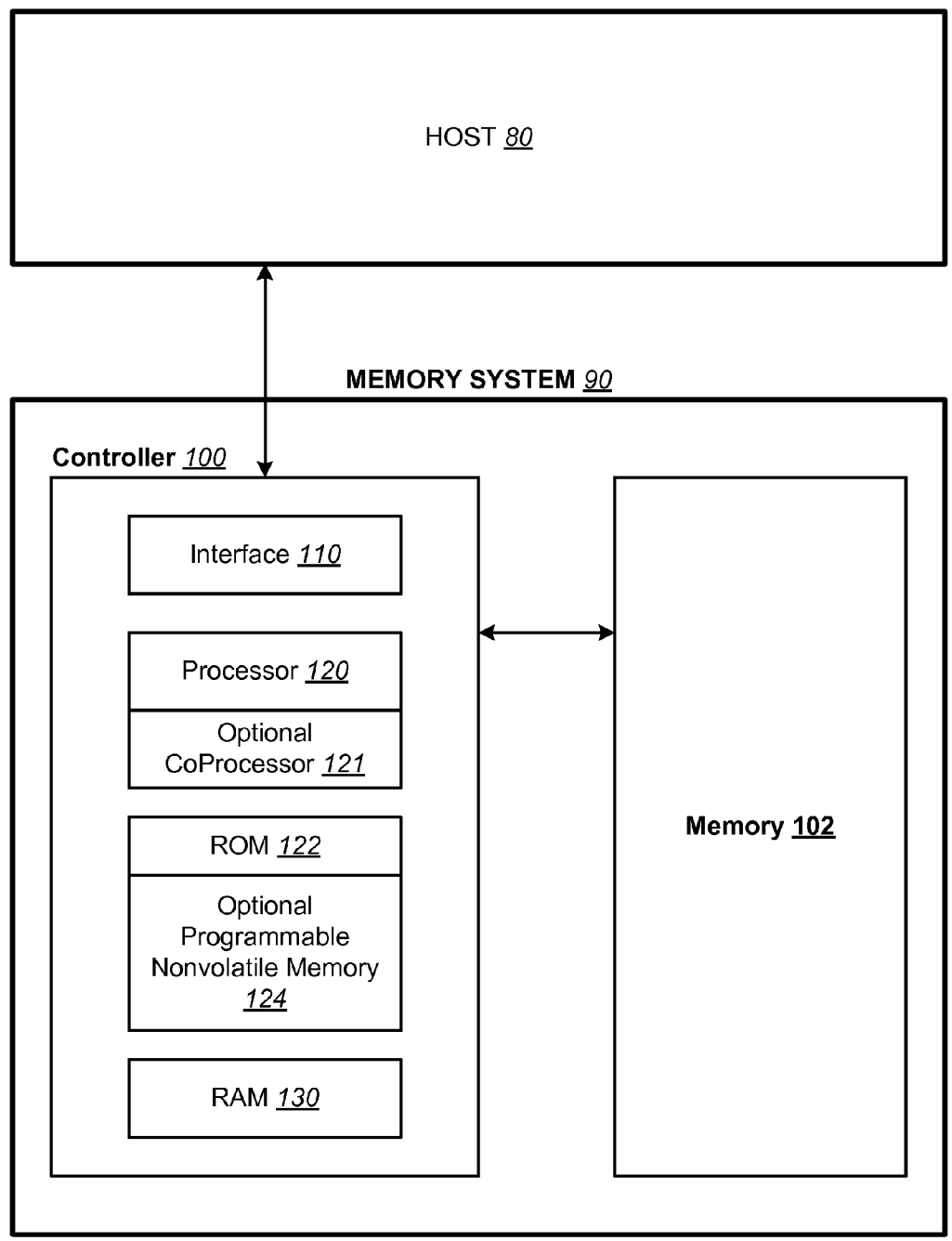
FIG. 1 illustrates schematically the main hardware components of a memory system.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

In other embodiments, types of memory other than the two dimensional and three dimensional exemplary structures described here may be used.

FIG. 1 illustrates schematically the main hardware components of a memory system suitable for implementing some of the techniques described here. The memory system 90 typically operates with a host 80 through a host interface. The memory system may be in the form of a removable memory such as a memory card, or may be in the form of an embedded memory system. The memory system 90 includes a memory 102 whose operations are controlled by a controller 100. The memory 102 comprises one or more array of non-volatile memory cells distributed over one or more integrated circuit chip. The controller 100 may include interface circuits 110, a processor 120, ROM (read-only-memory) 122, RAM (random access memory) 130, programmable nonvolatile memory 124, and additional components. The controller is typically formed as an ASIC (application specific integrated circuit) and the components included in such an ASIC generally depend on the particular application. Memory systems may be used with a variety of hosts in a variety of different environments. For example, a host may be a mobile device such as a cell phone, laptop, music player (e.g. MP3 player), Global Positioning System (GPS) device, tablet computer, or the like. Such memory systems may be inactive, without power, for long periods during which they may be subject to various conditions including high temperatures, vibration, electromagnetic fields, etc. Memory systems for such hosts, whether removable or embedded, may be selected for low power consumption, high data retention, and reliability in a wide range of environmental conditions (e.g. a wide temperature range). Other hosts may be stationary. For example, servers used for internet applications may use nonvolatile memory systems for storage of data that is sent and received over the internet. Such systems may remain powered up without interruption for extended periods (e.g. a year or more) and may be frequently accessed throughout such periods. Individual blocks may be frequently written and erased so that endurance may be a major concern.

Physical Memory Structure

Figure 2:
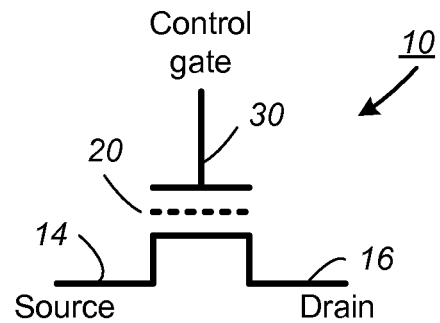
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a charge trapping (dielectric) layer. The memory cell 10 also includes a source 14, a drain 16, and a control gate 30.

There are many commercially successful non-volatile solid-state memory devices being used today. These memory devices may employ different types of memory cells, each type having one or more charge storage element.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current (cell-read reference current). In one implementation the detection of the conduction current relative to a threshold current is accomplished by examining the rate the conduction current is discharging through the capacitance of the bit line.

Figure 3:
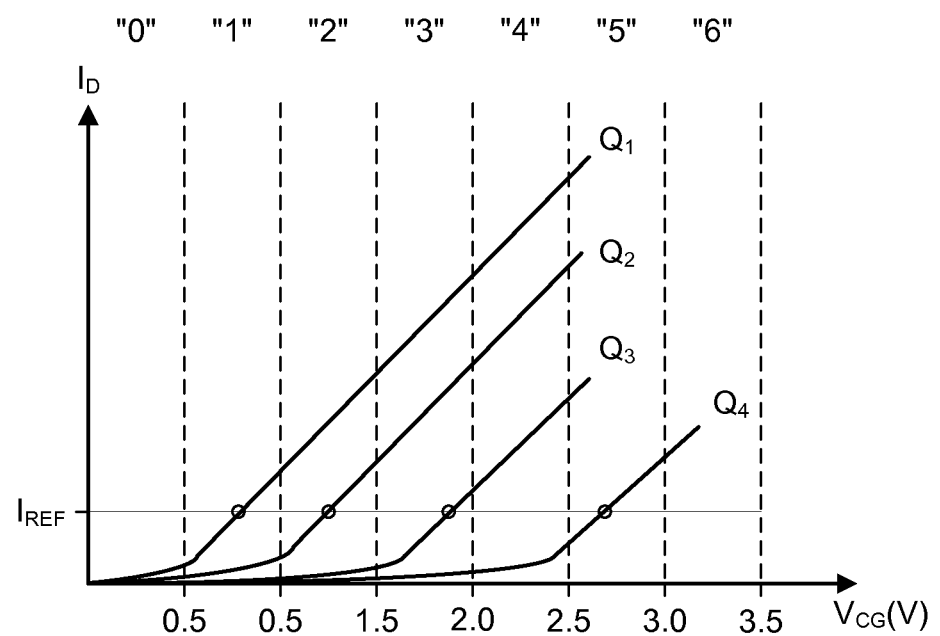
FIG. 3 illustrates the relation between the source-drain current $I_D$ and the control gate voltage $V_{CG}$ for four different charges Q1-Q4 that a floating gate may store.

FIG. 3 illustrates the relation between the source-drain current $I_D$ and the control gate voltage $V_{CG}$ for four different charges Q1-Q4 that the floating gate may be selectively storing at any one time. With fixed drain voltage bias, the four solid $I_D$ versus $V_{CG}$ curves represent four of seven possible charge levels that can be programmed on a floating gate of a memory cell, respectively corresponding to four possible memory states. As an example, the threshold voltage window of a population of cells may range from 0.5V to 3.5V. Seven possible programmed memory states "0", "1", "2", "3", "4", "5", "6", and an erased state (not shown) may be demarcated by partitioning the threshold window into regions in intervals of 0.5V each. For example, if a reference current, IREF of 2 μA is used as shown, then the cell programmed with Q1 may be considered to be in a memory state "1" since its curve intersects with IREF in the region of the threshold window demarcated by VCG=0.5V and 1.0V. Similarly, Q4 is in a memory state "5".

As can be seen from the description above, the more states a memory cell is made to store, the more finely divided is its threshold voltage window. For example, a memory device may have memory cells having a threshold voltage window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

NAND Structure

Figure 4A:
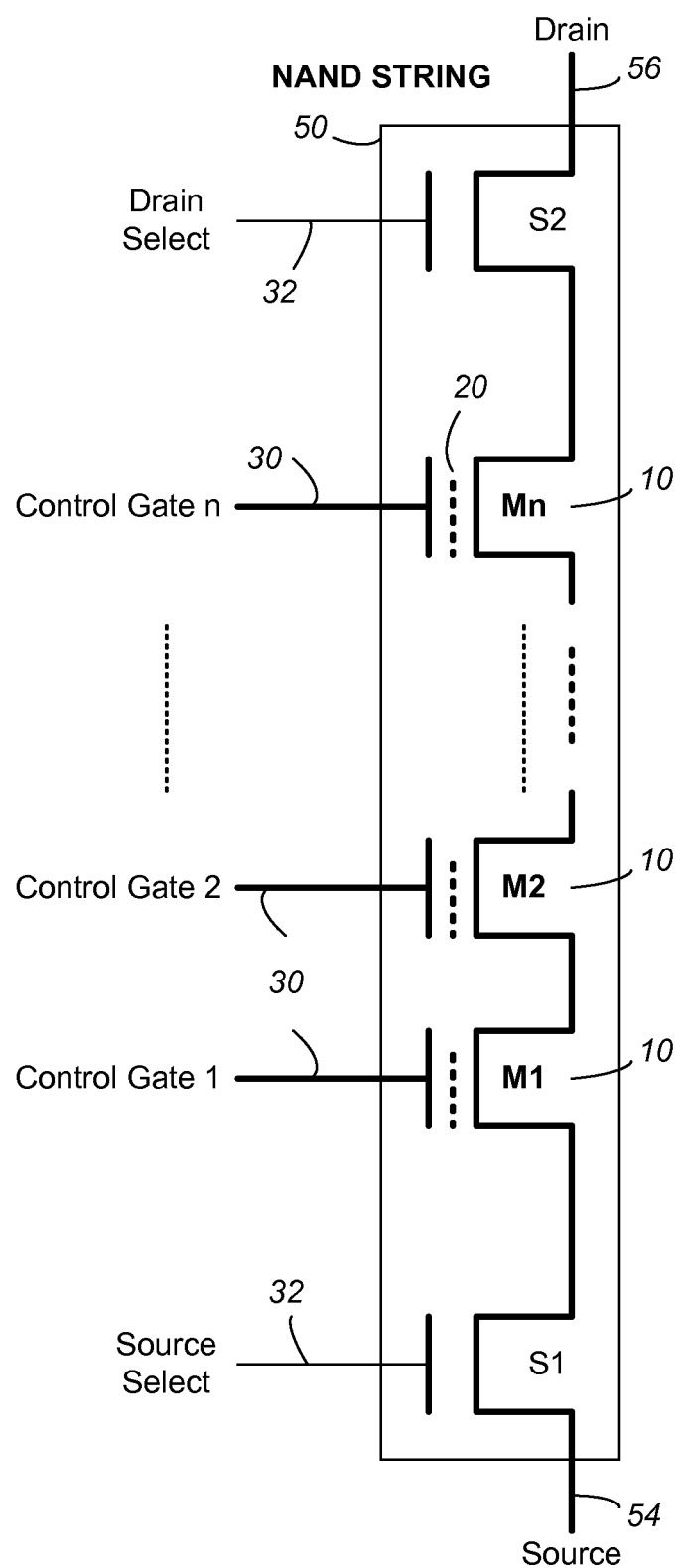
FIG. 4A illustrates schematically a string of memory cells organized into a NAND string.

FIG. 4A illustrates schematically a string of memory cells organized into a NAND string. A NAND string 50 comprises a series of memory transistors M1, M2, . . . Mn (e.g., n=4, 8, 16 or higher) daisy-chained by their sources and drains. A pair of select transistors S1, S2 controls the memory transistor chain's connection to the external world via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gate's 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within a NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effectively created from the source of the individual memory transistor to the source terminal 54 of the NAND string and likewise for the drain of the individual memory transistor to the drain terminal 56 of the cell.

Figure 4B:
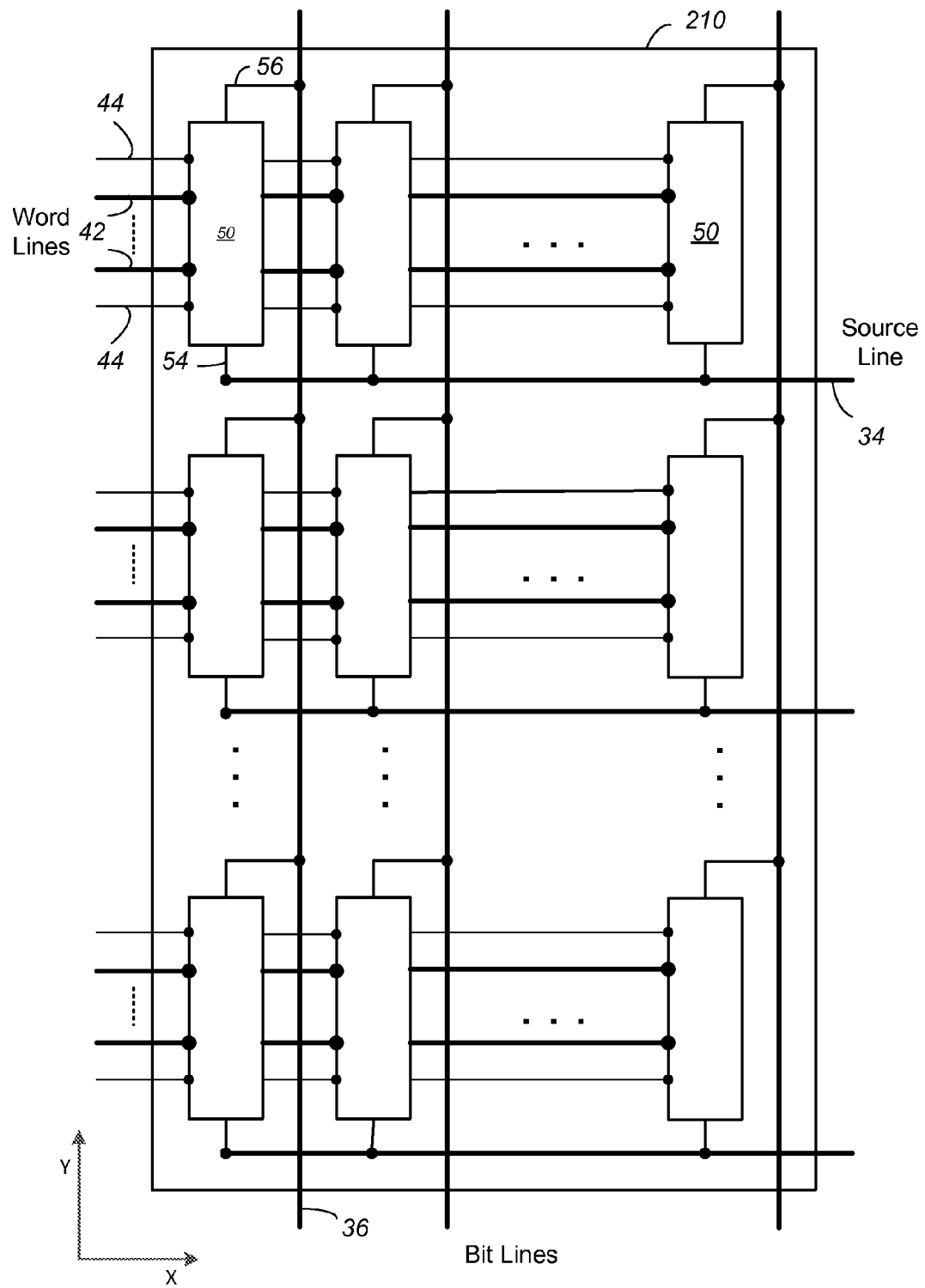
FIG. 4B illustrates an example of a NAND array 210 of memory cells, constituted from NAND strings 50 such as that shown in FIG. 4A.

FIG. 4B illustrates an example of a NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is coupled to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings.

Figure 5:
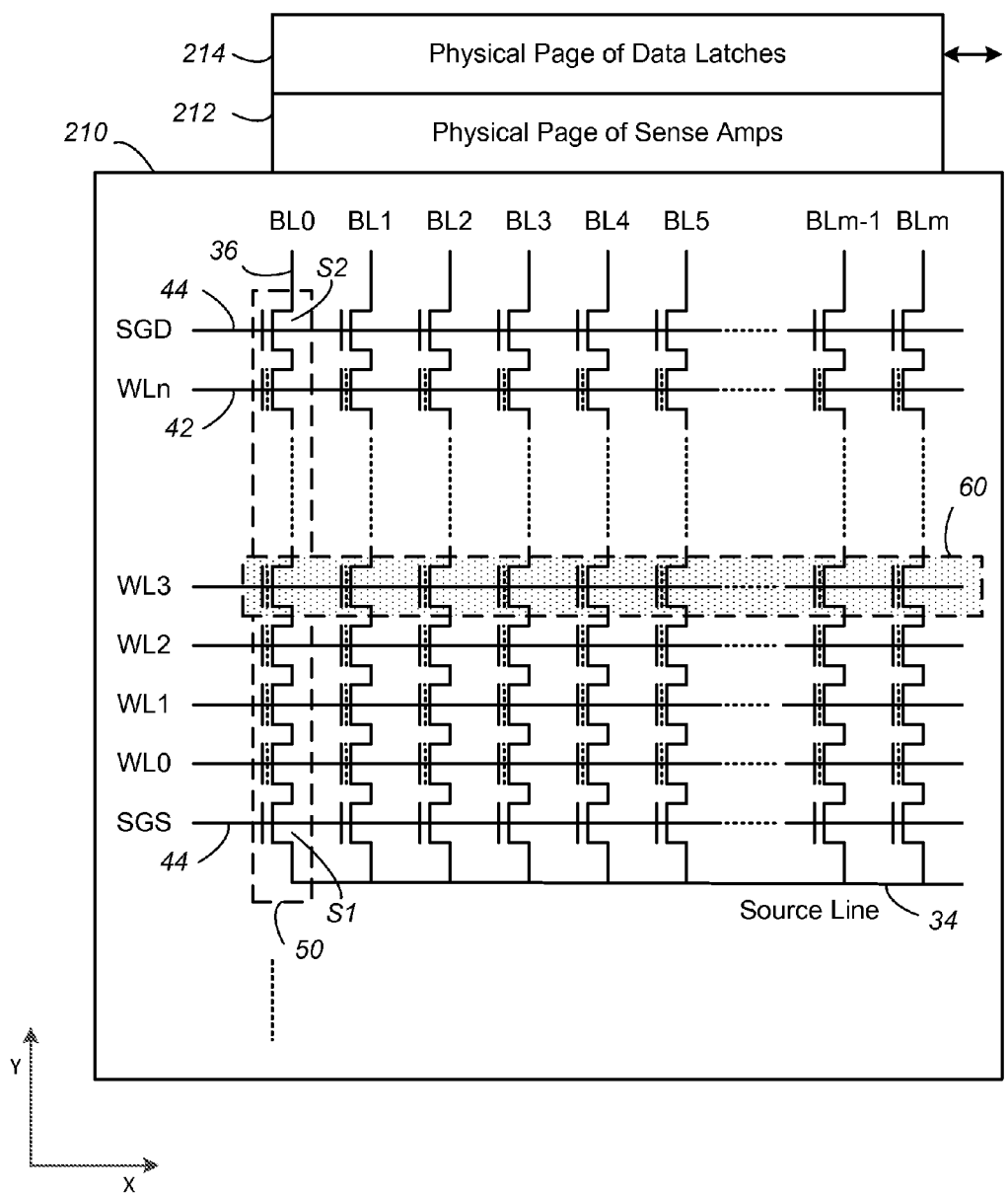
FIG. 5 illustrates a page of memory cells, organized in the NAND configuration, being sensed or programmed in parallel.

FIG. 5 illustrates a page of memory cells, organized in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A physical page, such as the page 60, is a group of memory cells enabled to be sensed or programmed in parallel. This is accomplished by a corresponding page of sense amplifiers 212. The sensed results are latched in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One difference between flash memory and other of types of memory is that a flash memory cell is generally programmed from the erased state. That is the floating gate is generally first emptied of charge. Programming then adds a desired amount of charge back to the floating gate. Flash memory does not generally support removing a portion of the charge from the floating gate to go from a more programmed state to a lesser one. This means that updated data cannot overwrite existing data and is instead written to a previous unwritten location.

Furthermore erasing is to empty all the charges from the floating gate and generally takes appreciable time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data.

Each block is typically divided into a number of physical pages. A logical page is a unit of programming or reading that contains a number of bits equal to the number of cells in a physical page. In a memory that stores one bit per cell (a Single Level Cell, or SLC" memory), one physical page stores one logical page of data. In memories that store two bits per cell, a physical page stores two logical pages. The number of logical pages stored in a physical page thus reflects the number of bits stored per cell. The term Multi Level Cell, or "MLC" is generally used to refer to memories that store more than one bit per cell, including memories that store three bits per cell (TLC), four bits per cell, or more bits per cell. In one embodiment, the individual pages may be divided into segments and the segments may contain the fewest number of cells that are written at one time as a basic programming operation. One or more logical pages of data are typically stored in one row of memory cells. A page can store one or more sectors. A sector includes user data and overhead data.

MLC Programming

FIG. 6A-6C illustrate an example of programming a population of 4-state memory cells. FIG. 6A illustrates the population of memory cells programmable into four distinct distributions of threshold voltages respectively representing memory states "E", "A", "B" and "C". FIG. 6B illustrates the initial distribution of "erased" threshold voltages for an erased memory. FIG. 6C illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed states "A", "B" and "C" or remain un-programmed in the "erased" state. As the memory gets more programming, the initial distribution of the "erased" state as shown in FIG. 6B will become narrower and the erased state is represented by the "0" state.

A 2-bit code having a lower bit and an upper bit can be used to represent each of the four memory states. For example, the "E", "A", "B" and "C" states are respectively represented by "11", "01", "00" and '10". The 2-bit data may be read from the memory by sensing in "full-sequence" mode where the two bits are sensed together by sensing relative to the read demarcation threshold values $rV_1$, $rV_2$ and $rV_3$ in three sub-passes respectively.

3-D NAND Structure

An alternative arrangement to a conventional two-dimensional (2-D) NAND array is a three-dimensional (3-D) array. In contrast to 2-D NAND arrays, which are formed along a planar surface of a semiconductor wafer, 3-D arrays extend up from the wafer surface and generally include stacks, or columns, of memory cells extending upwards. Various 3-D arrangements are possible. In one arrangement a NAND string is formed vertically with one end (e.g. source) at the wafer surface and the other end (e.g. drain) on top. In another arrangement a NAND string is formed in a U-shape so that both ends of the NAND string are accessible on top, thus facilitating connections between such strings.

FIG. 7 shows a first example of a NAND string 701 that extends in a vertical direction, i.e. extending in the z-direction, perpendicular to the x-y plane of the substrate. Memory cells are formed where a vertical bit line (local bit line) 703 passes through a word line (e.g. WL0, WL1, etc.). A charge trapping layer between the local bit line and the word line stores charge, which affects the threshold voltage of the transistor formed by the word line (gate) coupled to the vertical bit line (channel) that it encircles. Such memory cells may be formed by forming stacks of word lines and then etching memory holes where memory cells are to be formed. Memory holes are then lined with a charge trapping layer and filled with a suitable local bit line/channel material (with suitable dielectric layers for isolation).

As with planar NAND strings, select gates 705, 707, are located at either end of the string to allow the NAND string to be selectively connected to, or isolated from, external elements 709, 711. Such external elements are generally conductive lines such as common source lines or bit lines that serve large numbers of NAND strings. Vertical NAND strings may be operated in a similar manner to planar NAND strings and both Single Level Cell (SLC) and Multi Level Cell (MLC) operation is possible. While FIG. 7 shows an example of a NAND string that has 32 cells (0-31) connected in series, the number of cells in a NAND string may be any suitable number. Not all cells are shown for clarity. It will be understood that additional cells are formed where word lines 3-29 (not shown) intersect the local vertical bit line.

FIG. 8 shows a second example of a NAND string 815 that extends in a vertical direction (z-direction). In this case, NAND string 815 forms a U-shape, connecting with external elements (source line "SL" and bit line "BL") located on the top of the structure. At the bottom of NAND string 815 is a controllable gate (back gate "BG") which connects the two wings 816A, 816B of NAND string 815. A total of 64 cells are formed where word lines WL0-WL63 intersect the vertical local bit line 817 (though in other examples other numbers of cells may be provided). Select gates SGS, SGD, are located at either end of NAND string 815 to control connection/isolation of NAND string 815.

Figure 9:
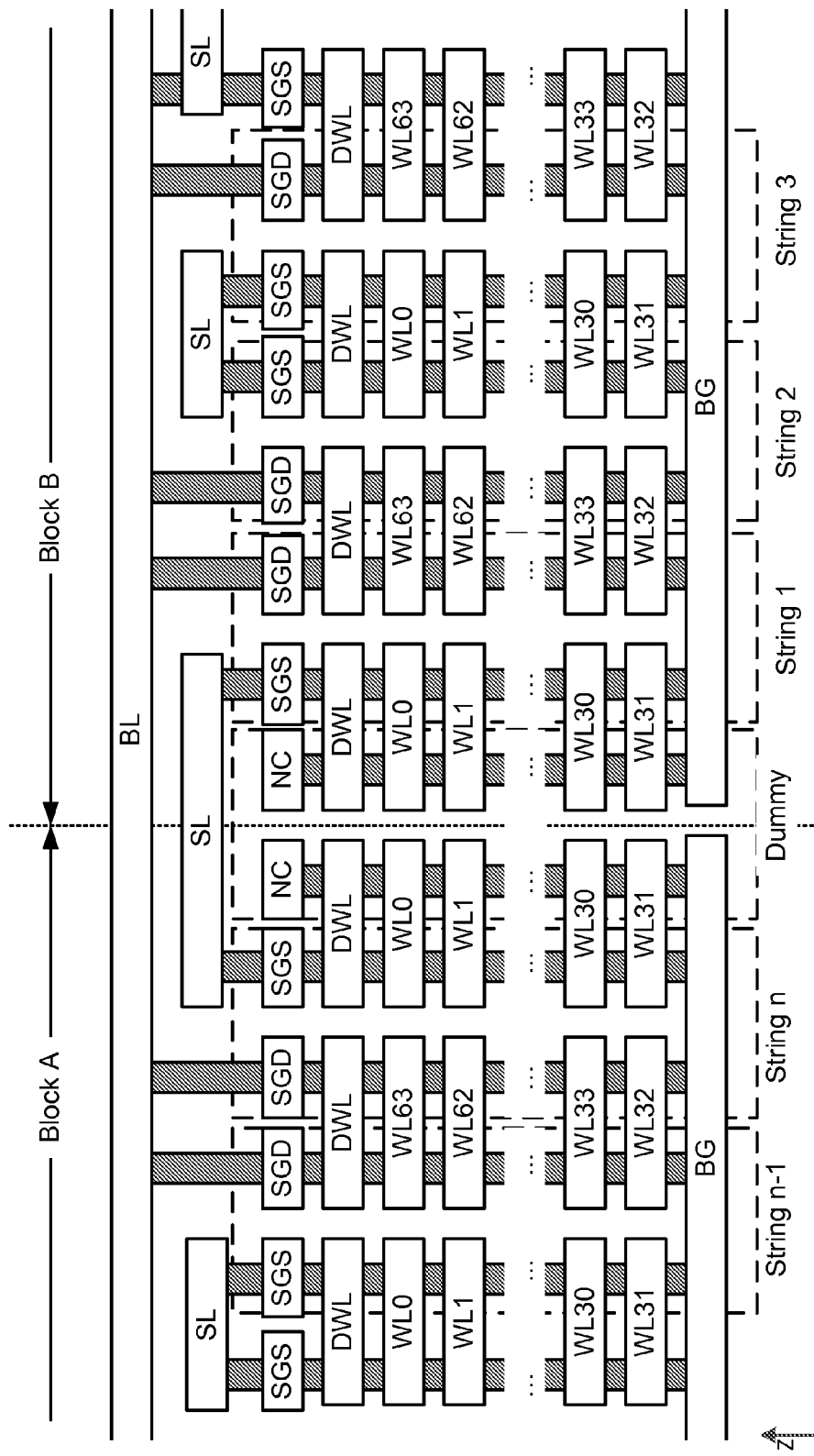
FIG. 9 shows an example of a cross section of a 3-D NAND memory array with U-shaped NAND strings in the y-z plane.

Vertical NAND strings may be arranged to form a 3-D NAND array in various ways. FIG. 9 shows an example where multiple U-shaped NAND strings in a block are connected to a bit line. In this case, there are n strings (Sting 1-String n) in a block connected to a bit line ("BL"). The value of "n" may be any suitable number, for example, 8, 12, 16, 32, or more. Strings alternate in orientation with odd numbered strings having their source connection on the left, and even numbered strings having their source on the right. This arrangement is convenient but is not essential and other patterns are also possible.

Common source lines "SL" connect to one end of each NAND string (opposite to the end that connects to the bit line). This may be considered the source end of the NAND string, with the bit line end being considered as the drain end of the NAND string. Common source lines may be connected so that all source lines for a block may be controlled together by a peripheral circuit. Thus, NAND strings of a block extend in parallel between bit lines on one end, and common source lines on the other end.

Figure 10:
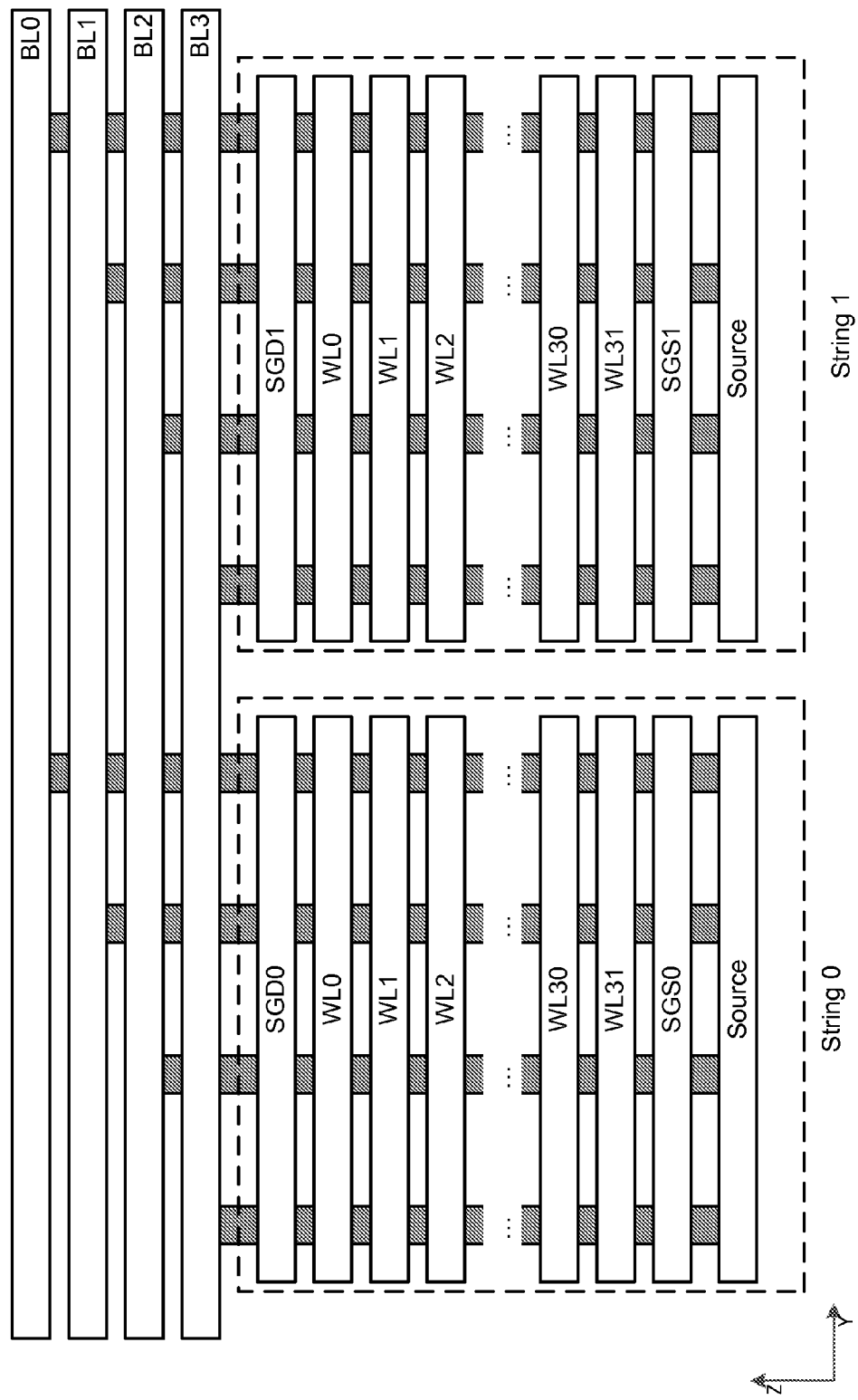
FIG. 10 shows an example of a cross section of a 3-D NAND memory with straight NAND strings in the y-z plane.

FIG. 10 shows a memory structure in which straight vertical NAND strings extend from common source connections in or near a substrate to global bit lines (BL0-BL3) that extend over the physical levels of memory cells. Word lines in a given physical level in a block are formed from a sheet of conductive material. Memory hole structures extend down through these sheets of conductive material to form memory cells. Within a given block there are multiple NAND strings connected to a given bit line. NAND strings are grouped into sets of strings that share common select gates. Thus, for example, NAND strings that are selected by SGS0 and SGD0 may be considered a set and may be designated as String 0, while NAND strings that are selected by SGS1 and SGD1 may be considered as a set and may be designated as String 1 as shown. A block may consist of any suitable number of such sets of strings. It will be understood that the cross-section of FIG. 10 shows portions of BL0-BL3, these bit lines extend further in the y-direction. Furthermore, additional bit lines extend parallel to BL0-BL3 (e.g. at different locations along x-axis, in front of, or behind the location of the cross-section of FIG. 10). Other three dimensional memories are based on resistive elements rather than charge storage elements.

Memory Bus

In some nonvolatile memory systems, two or more nonvolatile memory dies may be connected to a memory bus. For example, four, eight, or more NAND flash memory dies may be connected to a NAND controller over a memory bus. Such a multi-die bus may be used with any form of nonvolatile memory including planar, 3-D, charge storage memory (such as flash), resistive memory (such as ReRAM) and other forms of memory. In some cases, a memory controller may manage more than one memory bus, and each such memory bus may serve multiple nonvolatile memory dies.

While using a memory bus to communicate with multiple memory dies over a shared communication channel may provide significant saving compared with using dedicated communication channels for each memory die, a memory bus may become a bottleneck that reduces memory system performance in some situations. For example, in some cases, execution of a memory access command (read, write, or erase command) may be delayed because the memory bus is busy.

One example of a task that may occupy a memory bus and prevent other tasks from being performed is polling memory dies to identify when a memory die becomes available (ready). In some cases, a memory system may poll a particular die while waiting for that die to become available because there is another task to be performed using the die. For example, where a die is busy (unavailable) because it is writing data, the memory system may wait for the die to become ready in order to send more data to the die. During the polling there may be one or more other dies on the memory bus that are available to write more data. However, data is not transferred to these dies because the memory bus is busy with the polling operation.

An alternative to polling individual dies is to link blocks of multiple dies into metablocks that are then operated together in parallel. Thus, all dies on a particular memory bus may become available at substantially the same time (or at least in a predictable sequence) so that there is little or no time spent polling one die while other dies are ready.

Another alternative is to use one or more timers to estimate when a die will be ready. Thus, when a die starts a particular task, e.g. writing a first portion of data (e.g. a page) a timer may be initiated for the die. No polling may be performed until the timer indicates that the write is likely to have finished (e.g. based on comparison of the elapsed time and some previous write time). In this way, there is little time wasted on polling. However, such a system may be quite complex because it requires multiple timers and tracking average times for various tasks over multiple dies (or smaller units such as blocks) and may include updating such times as a memory ages. Such estimation may be inaccurate. There may still be occasions when estimated time is too short so that polling begins significantly before a die is ready and time is wasted by polling. In other cases, estimated time is too long so that polling is unnecessarily delayed and the die remains idle.

Figure 11:
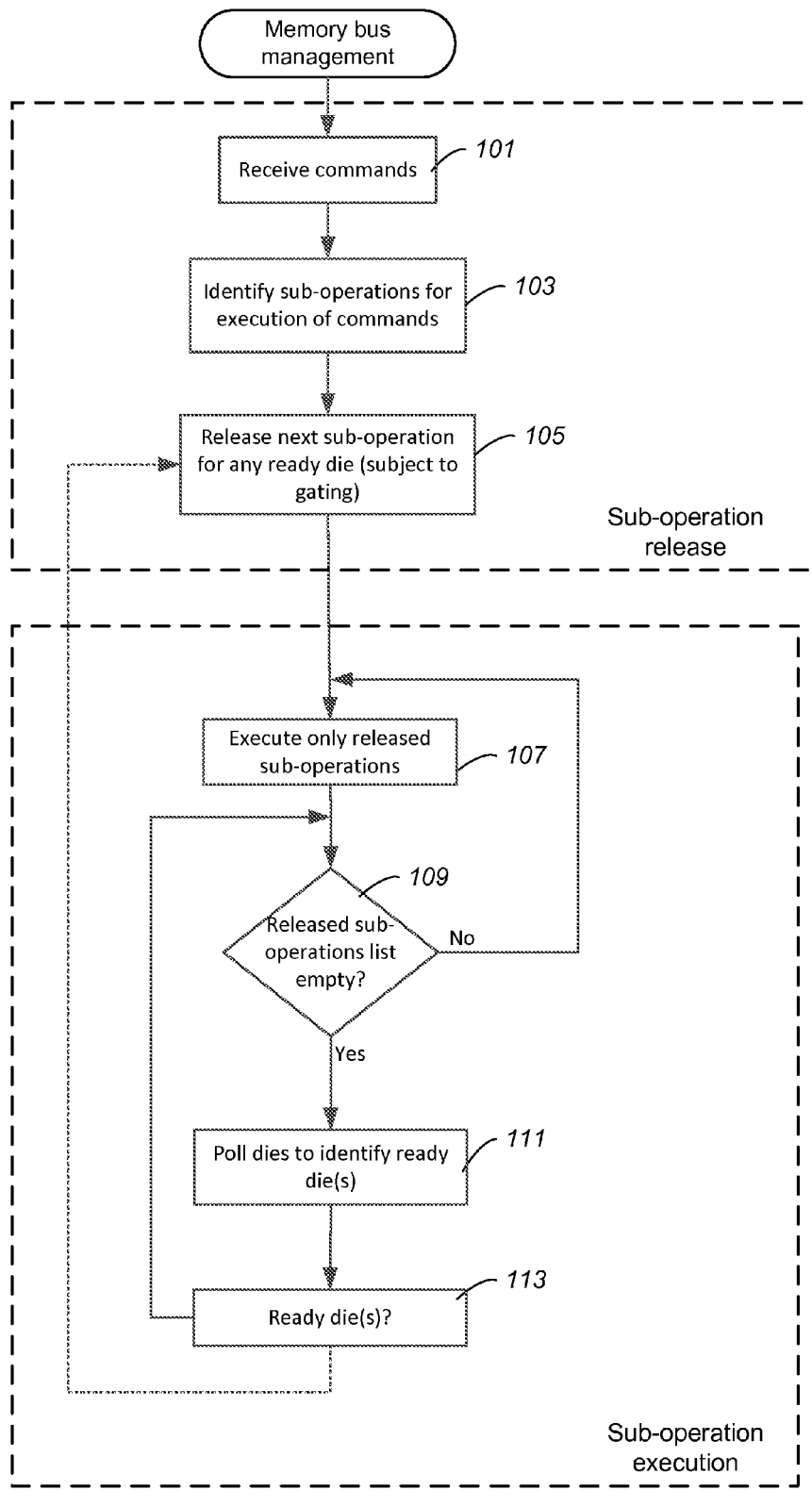
FIG. 11 illustrates an example of memory bus management.

An efficient scheme for managing a memory bus is illustrated in FIG. 11. Commands are received 101, for example, from a host over a host interface. Commands may also originate in a memory controller (e.g. commands related to internal operations such as garbage collection, updating memory management data, or block reclaiming). Sub-operations are then identified 103.

Identification of sub-operations may include parsing individual commands into sub-operations that are performed when executing the command. Sub-operations may be tasks that occupy the memory bus and can be performed as atomic operations, without interruption. Sub-operations should generally be relatively short and should not unnecessarily lump together tasks that may be more efficiently performed as separate sub-operations. For example, considering a read sense and read transfer as a single sub-operation would be inefficient because the memory bus would sit idle during the memory sense portion of the sub-operation. Writing to Multi Level Cell "MLC" (e.g. Three Level Cell or "TLC") memory cells may be considered as multiple sub-operations so that between such sub-operations in a die the memory bus may be used for other purposes (i.e. other dies may be accessed). Memory access commands such as read, write, and erase, generally require at least two such sub-operations. For example, a read command may require at least one read sense sub-operation to transfer physical address information to a memory die and initiate sensing of the addressed cells and at least one read transfer to transfer the sensed data from the die via the memory bus. Reading multiple logical pages from a physical page, and reading multiple dies may require many such sub-operations. A write command may require at least one write transfer sub-operation to transfer data and address information to a destination die over the memory bus and at least one status check to determine if the write was successful. An erase command may require at least a first sub-operation to identify a block to be erased and initiate erase and at least a second sub-operation to check if the erase was successful. In some cases, a command may correspond to a single sub-operation. For example, a command to change NAND parameters (e.g. to change parameters associated with reading, writing, and/or erasing a block, plane, or die) may only require a single sub-operation to transfer the new NAND parameters.

Sub-operations are released 105 (made available for execution) in a manner that ensures efficient use of the memory bus. Sub-operations are generally scheduled for execution in order of receipt of corresponding commands. Some re-ordering may be performed in some cases. Sub-operations are only released when a corresponding die is available. In some cases, only one sub-operation is released for a given die so that the list of released sub-operations may be one sub-operation deep. In some cases, more than one sub-operation for a die may be released at a time where two sub-operations may be efficiently performed back-to-back. For example, a read transfer sub-operation for previously-sensed data may be released with a read sense sub-operation for the next data to be read from the same die. Release of sub-operations may be subject to gating conditions so that in some cases a sub-operation may not be immediately released when a corresponding die is available.

In some cases, polling may indicate that a die is ready and a corresponding sub-operation is released and executed immediately. In other cases, the release of a corresponding sub-operation does not occur immediately but instead is delayed because of a gating condition. For example, in order to maintain power consumption at a level below a power consumption limit, release of a sub-operation may be delayed until some other sub-operation is finished. For example, a memory bus may have eight memory dies but power consumption may limit the number of dies performing a write operation to, for example, six dies. Thus, if six dies are already performing write sub-operations when another die becomes ready, release of the newly-ready die could cause seven dies to perform write sub-operations at the same time. In this situation, release of the sub-operation could be delayed until another die has finished writing. Power consumed during read, erase, and other operations may also be considered when making a determination to delay release. For example, an erase may be performed in one or more dies while reads are performed in other dies and writes are performed in yet other dies. The total power currently being consumed may be tracked and used to determine the difference between the current power consumption and the power consumption limit. If the additional consumption caused by releasing another sub-operation is within the power consumption limit, then the sub-operation may be released. If the additional consumption is not within the limit, then release may be delayed. The type of sub-operation may be considered since different sub-operations result in consumption of different amounts of power. Thus, a read sense sub-operation might be released immediately where an erase initiation sub-operation that initiates an erase, that requires more power than writing, might not be released immediately. Thus, various gating conditions may be applied to determine whether to release a particular sub operation.

Release of a sub-operation will transfer the sub-operation to a different list for execution. FIG. 11 shows upper steps 101-105 relating to sub-operation release and lower steps 107-113 relating to sub-operation execution. These two operations may proceed largely independently and may be asynchronous. Only released sub-operations are executed 107. During the time that released sub-operations are being executed no polling may be performed. In some cases, there may be exceptions, for example a multi-plane MLC write may be considered as a single sub-operation rather than as multiple atomic sub-operations. In this case, some polling may be performed within the multi-plane write to determine when the next page can be transferred, e.g. after transferring lower page data to two planes, polling may be used to determine when lower page data is written and the die is ready to receive middle page data. When one sub-operation is complete and the memory bus becomes available a determination is made as to whether the released sub-operation list is empty 109. If there is still at least one sub-operation in the released sub-operations list then execution continues. If the list of released sub-operations is empty then the memory dies are polled 111 to identify any ready die or dies 113. Thus, polling only occurs when there are no more sub-operations that can be executed immediately (i.e. sub-operations for dies known to be ready). No polling occurs as long as there is at least one sub-operation in the list so that execution of sub-operations continues until the list is empty. Polling may be limited to dies that are active (i.e. polling of inactive dies may be unnecessary). If all dies are inactive then no polling may be performed. Thus, when there are no sub-operations to perform the system may go into a low-power state with no execution of sub-operations or polling of dies. Subsequently, execution and polling may resume when a new command is received. When polling indicates that one or more dies are ready 113 then this is communicated (dotted line) for use in identification of sub-operations for release and corresponding sub-operations are released 105 and executed 107. In general, polling terminates and release and execution are initiated as soon as a ready die is identified so that polling does not continue for an extended period. For example, the next sub-operation may be released for all dies identified as ready. When polling 113 ends, the released sub-operation list is checked 109 to determine if there are any newly released sub-operations and to execute such sub-operations 107 if there are any. It can be seen that this scheme alternates between execution of sub-operations (during which no polling occurs), when the list is not empty, and polling of dies, which occurs only when the list becomes empty.

Release of sub-operations may also be triggered by events other than polling, such as release of a sub-operation that was held because a gating condition applied. For example, if a sub-operation is held because of a power consumption limit then the sub-operation may be released whenever power consumption drops to a level that allows the sub-operation to be performed without exceeding the power consumption limit (i.e. when the gating condition ceases to apply, the sub-operation may be released without additional polling). In some cases, a "virtual busy" condition may be used to indicate that a die that asserts a ready signal is not to be treated as ready (i.e. no sub-operation is to be released for such a die). Thus, gating conditions may be implemented by asserting a virtual busy condition that is then released when gating conditions are met. For example, a virtual busy condition may be used during read data transfer when a die asserts a ready signal in order to manage the release of subsequent sub-operations.

In some cases, there may be two or more sub-operations that can be released from the list of unreleased sub-operation because their dies are ready. The order in which such sub-operations are released and performed may be determined according to a prioritization scheme that may be based on rules to optimize performance. For example, if a read sense sub-operation is ready for release for one die while a read transfer sub-operation is ready for release for another die the read sense would generally be released first. This allows sensing in the die to proceed in parallel with the read transfer operation. A prioritization scheme may include delaying and/or ordering sub-operations based on power requirements as discussed above. In some cases, a host or controller may specify a particular order for release and/or execution. Data read from a memory may be returned to a host in a particular order (e.g. in order of logical address). To facilitate this, read sense and read transfer sub-operations may also be ordered according to logical address. In some cases, a memory controller may perform an operation that requires a particular order. For example, relocating data from one block to another (e.g. during garbage collection) may require read sense sub-operations for all dies to be performed before any write sub-operations are performed.

FIG. 12 illustrates an example of command handling that provides efficient memory bus use. Commands to be executed are received and may be placed in a queue 221 (e.g. in order in which they were received). A command parsing unit 223 identifies sub-operations corresponding to the commands. The identified sub-operations are placed in a pool of pending (unreleased) sub-operations 225. A release controller 227 then releases sub-operations only for dies that are determined to be ready subject to any gating conditions that may apply. Released sub-operations are maintained in a queue 229. Sub-operations are executed by the memory bus controller with each such sub-operation occupying the memory bus for an uninterrupted period of time. When there are no more released sub-operations in queue 229, memory bus controller 231 polls the dies to identify any available dies and identifies available dies to release controller 227 which may then release more sub-operations to queue 229 so that memory bus controller 231 may return to executing sub-operations.

Operation of a memory bus controller (e.g. memory bus controller 231) is illustrated in FIG. 13. A determination is made 341 as to whether there is a released sub-operation in the queue of released sub-operations. If there are any sub-operations in the queue then the next sub-operation in the queue is executed 343. If there are no released sub-operations remaining in the queue then dies are polled to identify ready dies 345. If there are ready dies then the memory bus controller informs the release controller so that corresponding sub-operations may be released.

Figure 14:
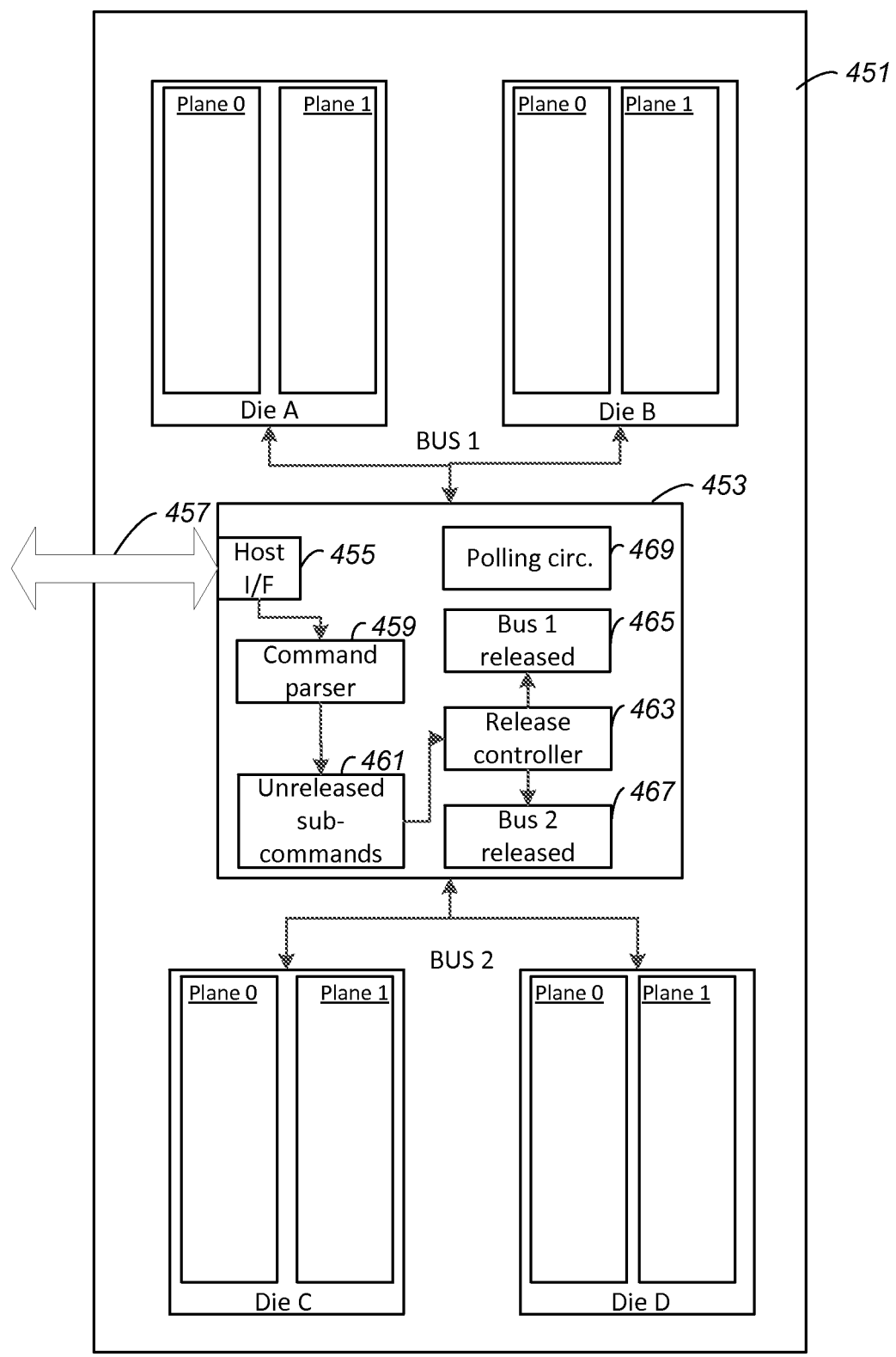
FIG. 14 illustrates memory system with two memory busses.

In some memory systems, a memory controller may manage more than one memory bus. FIG. 14 shows an example of a memory system 451 that manages two memory busses, Bus 1 and Bus 2. Bus 1 serves Die A and Die B while Bus 2 serves Die C and Die D. All dies include two planes in this example (plane 0 and plane 1). It will be understood that various other configurations may be implemented. For example, each bus may have more than two dies (e.g. four, eight, sixteen or more dies) and a controller may have more than two busses.

Memory controller 453 includes a host interface 455 that receives host commands over a communication channel 457. Additional commands may be generated within memory controller 453. Commands (from a host or otherwise) are sent to a command parser 459 which parses commands into constituent sub-operations. The sub-operations are placed in a queue of unreleased sub-commands 461. A release controller 463 releases sub-commands from the queue of unreleased sub-commands 461 and releases them to an appropriate queue of released sub-commands, either a queue 465 of released sub-commands for Bus 1 or a queue 467 of released sub-commands for Bus 2. Thus, Bus 1 and Bus 2 share a queue 461 of unreleased sub-commands while each bus has a dedicated queue of released sub-commands, queue 465 for Bus 1 and queue 467 for Bus 2. Each bus can thus operate separately based on its queue of released sub-operations. A polling circuit 469 is provided to poll dies of a given bus whenever the released sub-operation queue for the bus is empty. While a single polling circuit is shown, separate polling circuits may be provided for each bus so that each bus has its own dedicated polling circuit. While FIG. 14 illustrates memory controller 453 as comprising specific circuits, it will be understood that additional circuits may also be provided in the memory controller. It will also be understood that circuits in such a memory controller may be provided as dedicated circuits, programmable logic circuits, or general purpose physical circuits that are configured through software. Thus, the components illustrated in FIG. 14 are not necessarily physically separate circuits but may be functional portions of a memory controller that are configured for specific purposes by controller firmware. In some cases, a combination of dedicated circuits and software-configurable circuits in an Application Specific Integrated Circuit (ASIC) may form such a memory controller.

CONCLUSION

The foregoing detailed description has been presented for purposes of illustration and description. It is not intended to be exhaustive or to limit the attached claims. Many modifications and variations are possible in light of the above teaching.

It is claimed:

1. A method of managing a memory bus comprising:
receiving a plurality of memory access commands directed to a plurality of nonvolatile memory dies connected to the memory bus;
identifying sub-operations required for execution of the plurality of memory access commands, execution of an individual memory access command requiring execution of two or more sub-operations;
maintaining a first list of sub-operations required for execution of the plurality of memory access commands, the first list containing unreleased unexecuted sub-operations directed to individual dies that are not identified as available and unexecuted sub-operations directed to individual dies that are identified as available and for which a gating condition applies;
maintaining a second list of sub-operations required for execution of the plurality of memory access commands, the second list containing only released unexecuted sub-operations directed to the individual dies that are identified as available;
accessing the plurality of nonvolatile memory dies through the memory bus by executing only sub-operations from the second list until the second list is empty;
subsequently, when the second list is empty, polling the plurality of nonvolatile memory dies to identify individual nonvolatile memory dies of the plurality of nonvolatile memory dies that are available;
in response to identifying one or more available nonvolatile memory dies of the plurality of nonvolatile memory dies, moving one or more sub-operations from the first list to the second list; and
subsequently resuming accessing the plurality of nonvolatile memory dies through the memory bus by executing only sub-operations from the second list until the second list is empty.

2. The method of claim 1 wherein polling the plurality of nonvolatile memory dies occurs in response to the second list becoming empty and no polling occurs when there is at least one sub-operation in the second list.

3. The method of claim 2 further comprising alternating between polling the plurality of nonvolatile memory dies and accessing the plurality of nonvolatile memory dies through the memory bus until all sub-operations required for execution of the plurality of memory access commands are executed.

4. The method of claim 1 wherein resuming accessing the plurality of nonvolatile memory dies occurs as soon as a new entry is added to the second list.

5. The method of claim 1 wherein execution of an individual sub-operation is an atomic execution that occupies the memory bus without interruption for a continuous period of time.

6. The method of claim 1 wherein the plurality of memory access commands include a relocation command to copy data from a first physical location to a second physical location and wherein the one or more sub-operations include one or more reads from the first location and one or more writes to the second location, and wherein moving the one or more writes from the first list to the second list occurs only after the one or more reads are complete.

7. The method of claim 1 wherein unexecuted sub-operations are moved from the first list to the second list according to an order for execution of sub-operations corresponding to an order specified by a host for execution of the plurality of memory access commands.

8. The method of claim 1 wherein unexecuted write sub-operations relating to memory management data are moved from the first list to the second list according to an order specified by a memory controller.

9. The method of claim 1 further comprising, when moving the one or more sub-operations from the first list to the second list in response to identifying one or more available nonvolatile memory dies of the plurality of nonvolatile memory dies, delaying moving a sub-operation of the one or more sub-operations from the first list to the second list to thereby maintain a power consumption level below a power consumption limit.

10. The method of claim 1 further comprising, when moving the one or more sub-operations from the first list to the second list in response to identifying one or more available nonvolatile memory dies of the plurality of nonvolatile memory dies, prioritizing sub-operations according to a prioritization scheme.

11. The method of claim 10 wherein the prioritization scheme prioritizes read sense sub-operations over read transfer sub-operations.

12. A nonvolatile memory system comprising:
a plurality of nonvolatile memory dies;
a memory bus connected to the plurality of nonvolatile memory dies;
an interface configured to receive a plurality of memory access commands directed to the plurality of nonvolatile memory dies;
a command parsing unit configured to identify sub-operations required for execution of the plurality of memory access commands, execution of an individual memory access command requiring execution of two or more sub-operations;

a first list of sub-operations required for execution of the plurality of memory access commands, the first list containing unreleased unexecuted sub-operations;
a second list of sub-operations required for execution of the plurality of memory access commands, the second list containing only released unexecuted sub-operations directed to individual nonvolatile memory dies that are identified as available, the plurality of nonvolatile memory dies accessed through the memory bus by executing only sub-operations from the second list until the second list is empty;
a die polling unit configured to poll the plurality of nonvolatile memory dies to identify individual nonvolatile memory dies of the plurality of nonvolatile memory dies that are available; and
a list updating unit configured to update the second list by releasing a sub-operation for an individual nonvolatile memory die in response to identification of the individual nonvolatile memory die of the plurality of nonvolatile memory dies as available.

13. The nonvolatile memory system of claim 12 wherein the die polling unit is configured to remain inactive whenever there is at least one unexecuted sub-operation in the second list.

14. The nonvolatile memory system of claim 12 wherein the command parsing unit is configured to identify sub-operations that are atomic such that an individual sub-operation occupies the memory bus without interruption for a continuous period.

15. The nonvolatile memory system of claim 12 wherein the list updating unit moves individual unexecuted sub-operations directed to individual nonvolatile memory dies that are identified as available by the polling unit from the first list to the second list according to an order specified by a host or by a memory controller.

16. The nonvolatile memory system of claim 12 wherein the list updating unit is configured to move individual unexecuted sub-operations directed to individual nonvolatile memory dies that are identified as available by the polling unit from the first list to the second list such that the number of busy memory dies does not exceed a maximum number that is fewer than all memory dies of the plurality of memory dies.

17. The nonvolatile memory system of claim 12 wherein an individual nonvolatile memory die of the plurality of nonvolatile memory dies is a three dimensional nonvolatile memory die that is monolithically formed in one or more physical levels of arrays of memory cells having an active area disposed above a silicon substrate.

18. The nonvolatile memory system of claim 12 further comprising:
an additional memory bus connected to additional nonvolatile memory dies;
wherein the first list contains unexecuted sub-operations directed to individual nonvolatile memory dies of the plurality of nonvolatile memory dies and of the additional nonvolatile memory dies and the second list contains only unexecuted sub-operations directed to individual nonvolatile memory dies of the plurality of nonvolatile memory dies.

19. A method of managing a memory bus comprising:
receiving a plurality of memory access commands directed to a plurality of nonvolatile memory dies connected to the memory bus;
identifying sub-operations required for execution of the plurality of memory access commands, execution of an individual memory access command requiring execution of two or more sub-operations, each sub-operation being an atomic operation that occupies the memory bus without interruption for a continuous period of time;
maintaining a first list of unreleased sub-operations required for execution of the plurality of memory access commands, the first list containing unexecuted sub-operations directed to individual dies that are not identified as available and unexecuted sub-operations directed to dies that already have a released sub-operation;
maintaining a second list of released sub-operations required for execution of the plurality of memory access commands, the second list containing only unexecuted sub-operations directed to the individual dies that are identified as available, with a maximum of one unexecuted sub-operation per nonvolatile memory die that is identified as available;
accessing the plurality nonvolatile of memory dies through the memory bus by executing only released sub-operations from the second list until the second list is empty;
subsequently, in response to determining that the second list is empty, polling the plurality of nonvolatile memory dies to identify individual nonvolatile memory dies of the plurality of nonvolatile memory dies that are available;
in response to identifying one or more available nonvolatile memory dies of the plurality of nonvolatile memory dies, releasing one or more sub-operations from the first list to the second list;
subsequently resuming accessing the plurality of nonvolatile memory dies through the memory bus by executing only released sub-operations from the second list until the second list is empty, no polling of the plurality of nonvolatile memory dies occurring from the resuming until the second list is empty; and
subsequently alternating between polling the plurality of nonvolatile memory dies and accessing the plurality of nonvolatile memory dies until all sub-operations required for execution of the plurality of memory access commands are executed.

20. The method of claim 19 wherein the releasing the one or more sub-operations from the first list to the second list is performed according to at least one of: an order specified by a host, an order specified by a memory controller, or a power requirement.

21. The method of claim 19 wherein an individual nonvolatile memory die of the plurality of nonvolatile memory dies is a three dimensional nonvolatile memory die that is monolithically formed in one or more physical levels of arrays of memory cells having an active area disposed above a silicon substrate.

22. The method of claim 19 wherein identifying sub-operations comprises:
identifying a read sense sub-operation and a read transfer sub-operation for each received read command;
identifying a write transfer sub-operation and a write status check sub-operation for each received write command; and
identifying an erase initiation sub-operation and an erase status check sub-operation for each received erase command.

23. The method of claim 22 further comprising:
receiving a plurality of non-access commands, execution of an individual non-access command requiring execution of one or more sub-operation.

* * * * *